United States Patent [19]

von Bonin

[11] Patent Number: 4,831,062

[45] Date of Patent: May 16, 1989

[54] PREPARATION OF INTUMESCENT MATERIALS FOR COATINGS AND BUILDING ELEMENTS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 73,042

[22] Filed: Jul. 14, 1987

[30] Foreign Application Priority Data

Jul. 29, 1986 [DE] Fed. Rep. of Germany ....... 3625556

[51] Int. Cl.$^4$ ........................... C08J 9/00; C08K 9/00; C08G 18/00

[52] U.S. Cl. .................................... 521/103; 521/155; 521/169; 521/168; 521/165; 528/72; 528/44; 524/701

[58] Field of Search ............... 521/165, 168, 169, 155, 521/103; 528/72, 44; 524/701

[56] References Cited

U.S. PATENT DOCUMENTS

| | | | |
|---|---|---|---|
| 3,740,358 | 6/1973 | Christie et al. ...................... | 521/103 |
| 4,016,111 | 4/1977 | Wolff et al. .......................... | 521/103 |
| 4,338,412 | 7/1982 | von Bonin ............................ | 521/165 |
| 4,367,295 | 1/1983 | von Bonin ........................... | 521/165 |
| 4,438,028 | 3/1984 | Schmittmann et al. ............ | 521/103 |
| 4,463,106 | 7/1984 | Ruhl et al. ........................... | 521/103 |
| 4,550,124 | 10/1985 | Kucharska et al. ................. | 521/103 |

FOREIGN PATENT DOCUMENTS

| | | | |
|---|---|---|---|
| 0043952 | 1/1982 | European Pat. Off. ............ | 521/168 |
| 3235571 | 3/1984 | Fed. Rep. of Germany ...... | 521/165 |
| 1176638 | 8/1986 | Japan ................................... | 521/103 |

*Primary Examiner*—John Kight
*Assistant Examiner*—Dennis R. Daley
*Attorney, Agent, or Firm*—Sprung Horn Kramer & Woods

[57] ABSTRACT

New intumescent materials can be obtained by reacting polyisocyanates with phosphorus-containing condensation products containing at least two hydroxyl groups, and boron oxides and/or dehydration products of boric acid. They may be used for the production of coatings and building elements.

9 Claims, No Drawings

PREPARATION OF INTUMESCENT MATERIALS FOR COATINGS AND BUILDING ELEMENTS

The present invention relates to intumescent materials, coatings and building elements produced therefrom, and a process for the preparation of these intumescent materials, i.e. materials for preventive fire protection, and the preparation of these, which foam in case of fire, producing an insulating and fireproofing foam which protects the rear area, facing away from the fire, against fire and heat, and seals resultant distortions, cracks, joints and openings againt the passage of smoke and flames.

The intumescent materials known hitherto have the disadvantage that they either produce foams which are not mechanically stable against flame erosion and/or against extinguishing water to the desired extent (for example the intumescent materials known from EP-OS (European Published Specification) No. 51,347 and U.S. Pat. No. 3,955,987) or, as in the case of intumescent materials based on epoxy resins (see, for example, the products Pitchar and Chartek ®), are materials which, although having relatively high strengths, have undesired high viscosities or long hardening times, which impairs their applicability.

Intumescent materials have been found which are characterized in that they can be obtained by reaction of polyisocyanates with phosphorus-containing condensation products containing at least two hydroxyl groups, and boron oxides and/or dehydration products of boric acids.

Polyisocyanates which are suitable for the present invention are, for example, the isocyanates known from polyurethane chemistry. For example, aliphatic, cycloaliphatic, araliphatic, aromatic and heterocyclic polyisocyanates, such as described, for example, by W. Siefken in Justus Liebigs Annalen der Chemie, 562, 75–136, particularly those of the formula (2)

$$Q(NCO)_m \qquad (2)$$

in which m represents a number from 2 to 4, preferably 2.0 to 3.0, and

Q represents an aliphatic hydrocarbon radical having 2 to 18, preferably 6 to 10, C atoms, a cycloaliphatic hydrocarbon radical having 4 to 15, preferably 5 to 10, C atoms, an aromatic hydrocarbon radical having 6 to 15, preferably 6 to 13, C atoms, or an araliphatic hydrocarbon radical having 8 to 15, preferably 8 to 13, C atoms, are suitable.

Examples of polyisocyanates of the formula (2) are: ethylene diisocyanate, 1,4-tetramethylene diisocyanate, 1,6-hexamethylene diisocyanate, 1,12-dodecane diisocyanate, cyclobutane, 1,3-diisocyanate, cyclohexane 1,3- and 1,4-diisocyanate, and also any mixtures of these isomers, 1-isocyanato-3,3,5-trimethyl-5-isocyanatomethylcyclohexane (see DE-AS (German Published Specification) No. 1,202,785 and U.S. Pat. No. 3,401,190), 2,4- and 2,6-hexahydrotoluylene diisocyanate, and also any mixtures of these isomers, hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-toluylene diisocyanate, and also any mixtures of these isomers, diphenylmethane 2,4'- and/or 4,4'-diisocyanate, and also the multinuclear higher-functional derivatives thereof, and naphthalene 1,5-diisocyanate.

The following are furthermore suitable, for example: triphenylmethane 1,4',4"-triisocyanate, polyphenylpolymethylene polyisocyanates, as are obtained by aniline/formaldehyde condensation and subsequent phosgenation (see British Patent Specifications Nos. 874,430 and 848,671), m- and p-isocyanatophenylsulphonyl isocyanates (see U.S. Pat. No. 3,454,606), perchlorinated arylpolyisocyanates (see DE-AS (German Published Specification) No. 1,157,601=U.S. Pat. No. 3,277,138), polyisocyanates having carbodiimide groups (see German Patent Specification No. 1,092,007=U.S. Pat. No. 3,152,162, DE-OS (German Published Specifications) Nos. 2,504,400, 2,537,685 and 2,552,250), norbornane diisocyanates (see U.S. Pat. No. 3,492,330), polyisocyanates having allophanate groups (see British Patent Specification No. 994,890, Belgian Patent Specification No. 761,626 and Dutch Patent Specification No. 7,102,524), polyisocyanates having isocyanurate groups (see U.S. Pat. No. 3,001,973 and German Patent Specification Nos. 1,022,789, 1,222,067 and 1,027,394, and DE-OS (German Published Specifications) Nos. 1,929,034 and 2,004,048), polyisocyanates having urethane groups (see German Patent Specification No. 752,261 or U.S. Pat. Nos. 3,394,164 and 3,644,457), polyisocyanates having acylated urea groups (see German Patent specification No. 1,230,778), polyisocyanates having biuret groups (see U.S. Pat. Nos. 3,124,605, 3,201,372 and 3,124,605, and British Patent Specification No. 889,050), polyisocyanates prepared by telomerization reactions (see U.S. Pat. No. 3,654,106), polyisocyanates having ester groups (see British Patent Specifications Nos. 965,474 and 1,072,956, U.S. Pat. No. 3,567,763 and German Patent Specification No. 1,231,688), products of the reaction of the abovementioned isocyanates with acetals (see German Patent Specification No. 1,072,385) and polyisocyanates containing polymeric fatty acid esters (see U.S. Pat. No. 3,455,883).

It is also possible to employ the distillation residues having isocyanate groups, produced during industrial production of isocyanates, if appropriate dissolved in one or more of the abovementioned polyisocyanates. It is furthermore possible to use any mixtures of the abovementioned polyisocyanates.

The polyisocyanates which are readily available in industry, for example 2,4- and 2,6-toluylene diisocyanate, and any mixtures of these isomers (="TDI"), particularly the polyisocyanates of the MDI type, i.e. 4,4'- and/or 2,4'-diphenylmethane diisocyanate, and/or polyphenylpolymethylene polyisocyanates, as are prepared by aniline/formaldehyde condensation and subsequent phosgenation ("crude MDI"), and polyisocyanates which have carbodiimide groups, urethane groups, allophanate groups, isocyanurate groups, urea groups or biuret groups (=modified polyisocyanates), particularly those modified polyisocyanates which are derived from 2,4- and/or 2,6-toluylene diisocyanate or from 4,4'- and/or 2,4'-diphenylmethane diisocyanate, are preferred.

A proportion, for example up to a maximum of about 30% by weight, relative to the polyisocyanate, of monoisocyanates may be used concomitantly.

The phosphorus-containing condensation products containing at least two hydroxyl groups may be, for example, products of the condensation of the primary or secondary aliphatic, cycloaliphatic, aromatic, araliphatic or heterocyclic monoamines and/or polyamines with carbonyl compounds and dialkyl phosphites. Such condensation products may, if appropriate, additionally be oxyalkylated (see, for example, German Patent Specification No. 1,143,022, U.S. Pat. No. 3,076,010, DE-AS (German Published Specification) No. 1,803,747 and DE-AS (German Published Specification) No. 1,928,265). Preferred phosphorus-containing condensation products containing at least two hydroxyl groups correspond to the formula (1)

in which

R represents $C_1$-$C_8$-alkyl or $C_1$-$C_8$-hydroxyalkyl, and

X and $X_1$, independently of one another, represent hydrogen or methyl.

In the formula (1), R preferably represents ethyl or hydroxyethyl and X and $X_1$ preferably represent hydrogen.

Other polyols containing phosphorus atoms, for example hydroxyl group-containing esters of phosphorus-containing acids, such as phosphoric acids of the various degrees of condensation up to metaphosphoric acid, or of phosphonic acids or phosphinic acids, for example the alkoxylation products and/or reaction products thereof, salts of amines containing hydroxyl groups and of the various phosphoric acids, or amides of the various phosphoric acids which contain hydroxyl groups, are also suitable.

The boron oxides and/or dehydration products of boric acid may be, for example, the entire range of compounds which lies between the empirical formulae $H_3BO_3$ and $B_2O_3$. The more chemically bonded or even free water is present, the sooner this liberates carbon dioxide on reaction with polyisocyanates, and thus leads to generally less desired foam-like products. Therefore, boric acid which has been dried for 2 to 60 hours at at least 80° C., preferably at 100° to 130° C., at atmospheric pressure or boron trioxide are preferably employed. Boric acid which has been dried for 2 to 24 hours at 110° to 125° C. is particularly preferred, or $B_2O_3$.

Products of the addition of boric acid to hydroxyl compounds, such as pentaerythrite, glycerol, sugars or (boro)silicates, may be used in place of, but also in addition to, boron oxides and/or dehydration products of boric acid. Such addition products have preferably been dehydrated as described above.

The intumescent materials according to the invention may, if appropriate, contain fillers and/or auxiliaries in addition to the three essential components described above. Suitable fillers are, in particular, aluminum hydroxide and its dehydration products, and also calcium silicate, kaolin, chalk, glass, particularly in bead or fibre form, ground minerals, dolomite, dry or hydrated zeolites, gypsum, talc, rock wool, cement, coke, sawdust, metal powder, cyanamides, dicyanodiamides, ureas, allophanates, melamine and its condensation products with formaldehyde, hydrazodicarbonamides, urazoles, guanidines, biurets, and the polycondensation products and salts thereof. The polycondensation products are preferably water-insoluble urea or melamine/formaldehyde condensation products or phenol resins, and the salts are preferably salts of phosphoric acids. In general, the fillers may be natural or synthetic, inorganic or organic minerals which are solid, porous, hollow, crystalline, amorphous, powdery, in bead form or in fiber form, and, if appropriate, may contain water of crystallization or hydration.

The auxiliaries may be, for example, catalysts, polyalcohols, dyestuffs, plasticizers, compounds which can react with isocyanates, propellants and/or desiccants.

Suitable catalysts are, for example, organometallic compounds, for example tin, lead and/or cerium compounds, for example octoates, or tertiary amines, phospholine oxides or trimerization catalysts. The polyalcohols may be, for example, the polyesters and/or polyethers containing hydroxyl groups which are conventional in the area of polyurethane chemistry. Suitable plasticizers are, for example, those of the phosphoric acid ester and/or phosphonic acid ester type. Suitable compounds with which isocyanates can react are, for example, water, also water incorporated with boric acid as water of crystallization or hydration water, polyalcohols, polyepoxides, carbohydrates, glycerol, trimethylolpropane, glycol, neopentyl glycol, starch, cellulose, halogenated neopentyl glycol, pentaerythrite, sorbitol, bisphenols, such as bisphenol A and dihydroxydiphenylmethane, amines, such as ethanolamine, di- and triethanolamine, diaminodiphenylmethane, hydrazine, ethylenediamine and polyalkylene polyamines, and the ethoxyltion, propoxylation and/or epichlorohydrin reaction products thereof. If such compounds are able to react with isocyanates with crosslinking, these compounds may act as built-in carbonific, i.e. as a source of carbon for intumescent foam. The propellants may be, for example, nitrogen, nitrogen oxides, carbon monoxide, carbon dioxide, steam and/or other conventional propellants.

In the reaction of the polyisocyanates with phosphorus-containing condensation products containing at least two hydroxyl groups, and boron oxides and/or dehydration products of boric acids, polyisocyanate may be employed in the ratio, for example, of 50 to 130 mol-%, relative to the stoichiometrically necessary amount, to the hydroxyl groups of the reaction mixture. If water is introduced into the reaction mixture, it is always advisable to employ in addition the amount of polyisocyanate which reacts with water. Polyisocyanate is preferably employed in a ratio of 75 to 110 mol-%, relative to the stoichiometrically necessary amount, to the condensation product, and this ratio particularly preferably corresponds to the stoichiometrically necessary amounts. If less than the stoichiometrically necessary amount of polyisocyanate is employed, the intumescent materials obtained become gradually less water stable. If more than the stoichiometrically necessary amount of polyisocyanate is employed, the intumescent material obtained may be further reactive, which may be of advantage, for example, for crosslinking reactions, for the interaction with the material onto which such intumescents are to be applied, if appropriate, as coatings, for the interaction with other materials which are present in building elements containing such intumescent materials, or for later hardening reactions.

Boron oxides and/or dehydration products of boric acid may be employed, for example, in amounts from 0.5 to 35% by weight, relative to the total batch. This amount is preferably 3 to 20% by weight.

Fillers, particularly aluminum hydroxide and its dehydration products, may be present, for example, in amounts from 0 to 70% by weight, relative to the total intumescent material. The intumescent materials according to the invention preferably contain fillers in an amount from 10 to 45% by weight.

Auxiliaries may be employed, for example, in total amounts from 0 to 800% by weight, preferably 0 to 150% by weight, in particular 2 to 80% by weight, relative to polyisocyanate plus phosphorus-containing condensation products containing at least two hydroxyl groups.

The intumescent materials according to the invention may be solid, porous or foam-like, and have, for example, a density in the range from 0.1 to 1.8 g/cm$^3$. The density is preferably in the range from 0.2 to 1.5, particularly preferably in the range from 0.5 to 1.2, g/cm$^3$.

The intumescent materials according to the invention are distinguished by a number of advantages. Thus, in case of fire, they produce a particularly hard and resistant intumescent foam which has a good insulating effect, flame erosion resistance and strength. They have hardening times at room temperature which are in the seconds to minutes range; they can thus be prepared in virtually any thickness in one work process in the form of a coating or as a solid part, for example by spraying or casting. In the form of their carbonization products produced under the action of flame, they have a surprisingly high strength, since, hitherto, it was only known that phosphoric acids produce a solid phosphate ceramic in combination with aluminum oxides, but not that these could be markedly improved by the addition, according to the invention, of boric acid or boron oxide. They begin to foam at temperatures above 200° to 300° C., and expand, depending on the composition and the type of heating, by, for example, 50 to 1,000% by volume. They may be formulated without halogen and modified to be nonflammable.

The intumescent materials according to the invention may be used for the production of coatings and building elements. The present invention therefore also relates to coatings and building elements which have been produced using the intumescent materials described above. Such coatings may be applied, for example, to girders, pillars, panels or other elements. Building elements produced from intumescent materials according to the invention may be, for example, pipes, pipe cladding, cable conduits, wall panelling, container covers, shut-off devices, wall elements, housings, trim incorporated in or pressed into joints, sealing elements, semifinished products and preforms for safety devices, sandwiches, components of composite materials in sheet form, stoppers and sealing elements. Such coatings and building elements are preferably hard to tough and solid, porous or foam-like, and may be produced continuously or batch-wise.

There is a considerable demand for these coatings and building elements, particularly in shipbuilding, vehicle construction, mechanical engineering, building construction, refinery construction and civil engineering, in the construction of chemical plants, and in electrotechnology, particularly where the occurrence of water (for example perspiration, mixing water for mortar and cement, condensation, rainwater, groundwater) and, in case of fire, the occurrence of high temperatures, large-scale flame erosion and extinguishing water is to be expected.

It is possible to produce such coatings and building elements exclusively from the intumescent materials according to the invention, but they may also be coatings and building elements which contain the intumescent materials according to the invention as a component of a combination of materials. Other components of such combinations of materials may be, for example, reinforcing or reinforced elements, support substrates and any assembly or coating auxiliaries.

The present invention furthermore relates to a process for the preparation of intumescent materials and coatings and building elements containing these, which is characterized in that polyisocyanates are reacted with phosphorus-containing condensation products containing at least two hydroxyl groups, and boron oxides and/or dehydration products of boric acid. If appropriate, fillers and/or auxiliaries may be added to this reaction. Suitable and preferred species and suitable and preferred relative amounts have been described above for all essential and optional components of this reaction. Suitable reaction temperatures of the components are, for example, those in the range from −10° to 120° C. The reaction is preferably carried out as 10° to 45° C.

The intumescent materials are preferably prepared directly as building elements or coatings, for example by spraying-on, brushing-on or casting in open or closed molds or onto suitable substrates or supports, if appropriate with inflow of auxiliary gases and/or heat. Building elements in particular may also be produced via blanks or semifinished articles with subsequent mechanical processing. The semifinished articles may be, for example, foams, trim or coatings from which final products can be obtained, for example by cutting, molding or stamping, but also be thermoforming, welding, coating or sticking.

The preparation process according to the invention may be carried out by mixing all individual components or already premixed combinations of individual components. This mixing may also be carried out directly at, or in the vicinity of, the place at which the finished intumescent material is to be used. It is possible to introduce such mixtures by machine or by hand and with or without pressure, for example, into heated or unheated, open or closed molds or into apertures to be sealed, where they then harden and, at the appropriate time, are able to foam. They may also be applied to the substrates or bases to be protected.

By combining the intumescent materials according to the invention with foamed or solid, inorganic or organic additives, for example polystyrene foam, polyurethane foam, phenolics, aminoplastics or gravel, expanded clay, urea or phenolic resin foams, foamed glass, glass fibers, wood, mineral wool or pumice, composite materials having specific intumescent properties can also be obtained as building elements. It is likewise possible to produce coatings or building elements which are reinforced with fibers, wires, woven fabrics, ropes or nonwoven fabrics of organic or inorganic materials, or to use them as components in multilayer or sandwich structures. The intumescent materials according to the invention can also be used in combination with other organic- or inorganic-based intumescent materials.

The following examples serve to illustrate the invention.

EXAMPLES

The parts specified are parts by weight or percent by weight, unless otherwise noted.

The following types of polyisocyantes were employed:

Polyisocyanate A: Industrial 4,4'-diphenylmethane diisocyanate containing isomers and about 10% of higher-functional multinuclear components. Isocyanate content about 31%.

Polyisocyanate B: Similar polyisocyanate to A with approximately twice the content of higher-condensed components. Isocyanate content approximately 31%.

Polyisocyanate C: Similar polyisocyanate to A with approximately fourfold the content of higher-condensed components. Isocyanate content about 31%.

Industrial products having the following idealized structures were employed as phosphorus-containing condensation products containing at least two hydroxyl groups for reaction with the polyisocyanates:

Condensation product K:

$(C_2H_5O)_2POCH_2N(C_2H_4OH)_2$.

Condensation product L:

$(CH_3O)_2POCH_2N(C_3H_6OH)_2$ (isopropyl type).

The following fillers were employed:
Filler A: Al hydroxide, Apyral ® B 2, Bayer AG
Filler B: Al hydroxide, Apyral ® B 90, Bayer AG
Filler C: Ca carbonate Calcidar ® 40, Omya, Cologne
Filler D: Glass powder, grain size 75–150 microns.

The following additives were employed:
Additive A: Branched polyester made from glycerol, ethylene glycol and adipic acid; OH number 255, acid number 0.8
Additive B: Ethylene oxide polyether initiated on glycerol; OH number 250, acid number 0.1
Additive C: Tin octoate
Additive D: Titanium dioxide white pigment
Additive E: Anhydrous zeolite powder, Baylith ® T, Bayer AG
Additive F: Dimethyl methylphosphonate
Additive G: Melamine phosphate
Additive H: Permethylated $\beta,\beta$-diaminodiethyl ether.

The following boron compounds (BC) were employed:
BC A: Commercially available boric acid in powder form
BC B: BC A dried for 48 hours at 120° C. in a circulation drying cabinet
BC C: Commercially available powdered boron trioxide.

The intumescent materials were prepared by mixing the condensation product, as a mixture (x) with the remaining components, with the isocyanate (y) at 15° C. with vigorous stirring, pouring the mixture into a sealable vertical sheet mold of thickness 2 cm, which was preheated to 40° C., and reacting therein. Demolding was effected after 10 minutes.

The mixture (x) was furthermore fed via eccentric single-rotor screw pumps or ger pumps to a stirrer mixing head known from polyurethane technology, mixed there with the isocyanate component (y), and then sprayed in a stream of air onto freshly sand-blasted steel sheets (50×50 cm) of thickness 2 mm to form a coating thickness of 1 cm. After 10 days, these sheets were flame-treated in a flammability test in a small-scale fire chamber in accordance with DIN 4102. The coating was applied on the flame side, and the average reverse side temperature on the steel sheet was determined at 5 measuring points as a function of the duration of flame treatment.

The intumescent materials prepared are shown in tabulated form below according to their recipes.

The amounts of components specified in the table relate to parts by weight. The hardening (approximate time in minutes) is specified as the time (approximate time in minutes) after which the sprayed-on coating was no longer free-flowing and "stood", i.e. no longer flowed off, at an ambient temperature of about 19° C. The specific gravity was determined on the demolded sheet from cubes of edge length 1.5 cm. The intumescence was specified as the respective greatest height, in cm, which the intumescent material reached in the small-scale flammability test, starting from a coating thickness of 1 cm. The stability denotes the stability, determined empirically by comparison imprint experiments (measured using a klein Penetrometer), of the intumescent foam formed in the small-scale flammability test. In this test, the very loose and unstable intumescent foam obtained on flame treatment of a reference sample according to Example 1 and 2 was awarded grade 6 and the stability of standard solid gas coke was awarded grade 1, producing a relative scale of assessment of the stability. Temperature 120 in the table denotes the average temperature (°C.) determined on the uncoated side of the steel sheet after an experimental duration of 120 minutes.

TABLE 1

| | | Example No. | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| P condensation prod. | K | 100 | | 100 | 50 | 100 | 100 | 100 | 100 | 100 | 100 | 100 | 100 | 100 | 100 | 100 | 50 | 100 |
| P condensation prod. | L | | 60 | | 50 | | | | | | | | | | | | 50 | |
| Additive | A | 100 | | 100 | | 100 | | 100 | 100 | 100 | 100 | | 100 | 100 | | 100 | | 100 |
| Additive | B | | 100 | | 100 | | 100 | | | | | 100 | | | 100 | | | |
| Additive | C | | | | | | | | | | | | | | 0.5 | 0.5 | | |
| Additive | D | 3 | 3 | 5 | 5 | 5 | 5 | 5 | 5 | 5 | 5 | 5 | 5 | 5 | 5 | 5 | | 3 |
| Additive | E | 15 | 15 | 20 | 20 | 20 | 20 | 20 | 20 | 20 | 20 | 20 | 20 | 20 | 20 | 20 | 20 | 18 |
| Additive | F | | | | | | | | | | | | | | | 570 | | |
| Additive | G | 100 | 50 | | | | | | | | | | | | | | | 60 |
| Additive | H | | | | | | | | | | | | | 1.1 | | 0.5 | | |
| Filler | A | | | 200 | 150 | 160 | 160 | 160 | 140 | 120 | 100 | 160 | | 160 | 160 | 160 | | |
| Filler | B | | 15 | | | | | | | | | | 80 | | | | 80 | |
| Filler | C | | | | 50 | | | | | | | | 40 | | | | | |
| Filler | D | | | | | | | | | | | | 40 | | | | | |
| Boron compound | A | | | | | 40 | 40 | | | | | | | | | | | |
| Boron compound | B | | | | | | | 40 | 60 | 80 | 100 | | | | 40 | 20 | | |
| Boron compound | C | | | | | | | | | | | 40 | 40 | 40 | | 20 | 40 | 40 |
| Polyisocyanate | A | | 120 | | | | | | | | | | | | | | | 70 |
| Polyisocyanate | B | | | 180 | | | | | | | | | | | | | | |
| Polyisocyanate | C | 140 | | | 180 | 180 | 180 | 180 | 180 | 180 | 180 | 180 | 180 | 180 | 180 | 180 | 110 | 70 |

TABLE 1-continued

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Hardening (approx., min) | 2.5 | 2.5 | 1.7 | 1.8 | 2.0 | 1.8 | 1.7 | 1.7 | 1.7 | 1.7 | 1.5 | 1.5 | 0.7 | 0.5 | 0.5 | 1.9 | 2.6 |
| Specific gravity (g/cm$^3$) | 1.15 | 1.13 | 1.14 | 1.15 | 0.31 | 0.28 | 1.15 | 1.14 | 1.15 | 1.15 | 1.13 | 1.21 | 1.12 | 1.13 | 1.11 | 1.00 | 1.13 |
| Intumescence (cm) | 14 | 11 | 8 | 7 | 2 | 2 | 8 | 7 | 7 | 7 | 6 | 6 | 5 | 5 | 6 | 8 | 10 |
| Stability | 6 | 6 | 5 | 5 | 3 | 3 | 3 | 2 | 1–2 | 1–2 | 1–2 | 1 | 2 | 2 | 2 | 2 | 3 |
| Temp. 120 | 940 | 980 | 310 | 320 | 820 | 800 | 320 | 310 | 300 | 300 | 310 | 355 | 305 | 315 | 300 | 325 | 360 |

NOTES ON EXAMPLES 1 TO 17

Example 1: is a comparison example for characterization of very soft intumescent foam without addition of boron compounds.

Example 2: comparison example. As in Example 1, the poor resistance of intumescent foam against flame erosion is shown by the fact that the average temperature after 120 minutes has exceeded the 600° C. mark due to erosion of the foam by the flame.

Example 3: comparison example. A relatively highly active coating material whose intumescent foam, although withstanding the small-scale flammability test, still has inadequate stability, not being able to offer sufficient resistance against, for example, a jet of extinguishing water, is apparent here.

Example 4: comparison example. As Example 3, using a polyether additive which is more stable towards saponification.

Examples 5 and 6: it is apparent here that, although the use of undehydrated boric acid is possible, it leads to highly porous products which do not prove to be particularly good in the flammability test, in spite of a very stable intumescent effect, but one which, due to lack of mass, is less effective. Rather, dehydrated boric acids are used to produce readily usable products.

Examples 7 to 11 demonstrate that the solid character of the coatings and molded articles does not worsen with increasing amounts of dehydrated boric acid, and that the coatings obtainable have good fire properties along with excellent stability of the intumescent foam. Use amounts of about 20% of dehydrated boric acid or boron trioxide (according to the example relative to the amount of filler plus boron compounds) produce adequate effects.

Example 12: by selecting a suitable filler combination, the stability can be further increased at the given amount of boron compound.

Examples 13 and 14: the addition of catalysts for acceleration of the reaction has a noticeable effect, so that, caused by the short reaction times which can be achieved, greater coating thicknesses can be applied in one step after the spraying process.

Example 15: the addition of additive F increases the sprayability by reducing the viscosity and leads to a somewhat tougher final product. The improved resistance against burning when subjected to a bunsen burner flame compared to Example 5 is advantageous.

Example 16: a material with a stable intumescent foam is also available without polyester or polyether additives.

Example 17: the addition of dehydrated boric acid stabilized the intumescent foam from Comparison Example 1 to a satisfactory degree.

It will be appreciated that the instant specification and claims are set forth by way of illustration and not limitation, and that various modifications and changes may be made without departing from the spirit and scope of the present invention.

What is claimed is:

1. An intumescent material obtained by reacting a polyisocyanate with a phosphorus-containing condensation product containing at least two hydroxyl groups, and at least one boron-containing compound selected from the group consisting of a boron oxide and a dehydration product of a boric acid.

2. An intumescent material according to claim 1, wherein the polyisocyanate is of the formula Q(NCO)$_m$ in which m represents a number from 2 to 4, and Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or an araliphatic hydrocarbon radical having 8 to 15 C atoms.

3. An intumescent material according to claim 2, in which m is from 2 to 3.

4. An intumescent material according to claim 1, wherein the phosphorus-containing condensation product is of the formula (RO)$_2$PO—CH$_2$—N(CHX—CHX$_1$—OH)$_2$ in which R represents C$_1$-C$_8$-alkyl or C$_1$-C$_8$-hydroxyalkyl, and X and X$_1$, independently of one another, represent hydrogen or methyl.

5. An intumescent material according to claim 1, wherein the boron-containing compound is boron trioxide or boric acid which has been dried for 2 to 60 hours at at least 80° C. at atmospheric pressure.

6. An intumescent material according to claim 1, further containing a filler comprising aluminum hydroxide or a dehydration product thereof.

7. An intumescent material according to claim 1, further containing at least one auxiliary selected from the group consisting of a catalyst, polyalcohol, dyestuff, plasticizer, compound which can react with an isocyanate, propellants and desiccant.

8. An intumescent material according to claim 1, wherein the polyisocyanate is reacted in the ratio to hydroxyl groups of the reaction mixture of 50 to 130 mol-%, relative to the stoichiometrically necessary amount, and the boron-containing compound is reacted in from 0.5 to 35% by weight, relative to the total batch.

9. An intumescent material according to claim 8, wherein the polyisocyanate is of the formula Q(NCO)$_m$ in which
- m represent a number from 2 to 3, and
- Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or an araliphatic hydrocarbon radical having 8 to 15 C atoms, the phosphorus-containing condensation product is of the formula $$(RO)_2PO-CH_2-N(CHX-CHX_1-OH)_2$$

in which
- R represents $C_1-C_8$-alkyl or $C_1-C_8$-hydroxyalkyl, and
- X and $X_1$, independently of one another, represent hydrogen or methyl, and the boron-containing compound is boron trioxide or boric acid which has been dried for 2 to 60 hours at at least 80° C. at atmospheric pressure.

* * * * *